United States Patent
Larsen et al.

(10) Patent No.: US 9,496,576 B2
(45) Date of Patent: Nov. 15, 2016

(54) THIN SOLID OXIDE CELL

(75) Inventors: Peter Halvor Larsen, Roskilde (DK); Soeren Linderoth, Roskilde (DK); Peter Vang Hendriksen, Hilleroed (DK)

(73) Assignee: Technical University of Denmark (DK)

(*) Notice: Subject to any disclaimer, the term of this patent is extended or adjusted under 35 U.S.C. 154(b) by 1065 days.

(21) Appl. No.: 12/515,816

(22) PCT Filed: Nov. 23, 2007

(86) PCT No.: PCT/EP2007/010194
§ 371 (c)(1),
(2), (4) Date: Nov. 13, 2009

(87) PCT Pub. No.: WO2008/061782
PCT Pub. Date: May 29, 2008

(65) Prior Publication Data
US 2010/0062312 A1 Mar. 11, 2010

(30) Foreign Application Priority Data
Nov. 23, 2006 (EP) .................................. 06024338

(51) Int. Cl.
*H01M 8/12* (2016.01)
*H01M 4/90* (2006.01)
(Continued)

(52) U.S. Cl.
CPC ........ *H01M 8/1213* (2013.01); *B01D 67/0041* (2013.01); *B01D 67/0046* (2013.01);
(Continued)

(58) Field of Classification Search
CPC ............................................. H01M 4/86–4/96
USPC ................. 429/479–487, 491, 495–496
See application file for complete search history.

(56) References Cited

U.S. PATENT DOCUMENTS 4,329,403 A * 5/1982 Baker .................... H01M 8/142
429/478
5,114,803 A * 5/1992 Ishihara ................ H01M 4/861
429/495

(Continued)

FOREIGN PATENT DOCUMENTS

CA 2709211 A1 6/2009
CN 1520623 A 8/2004

(Continued)

OTHER PUBLICATIONS

Larsen, "All Ceramics Solid Oxide Fuel Cell," U.S. Appl. No. 14/255,716, filed Apr. 17, 2014, 51 pages.

(Continued)

*Primary Examiner* — Jonathan Crepeau
*Assistant Examiner* — Jacob Buchanan
(74) *Attorney, Agent, or Firm* — Seed IP Law Group LLP

(57) ABSTRACT

The present invention relates to a thin and in principle unsupported solid oxide cell, comprising at least a porous anode layer, an electrolyte layer and a porous cathode layer, wherein the anode layer and the cathode layer comprise an electrolyte material, at least one metal and a catalyst material, and wherein the overall thickness of the thin reversible cell is about 150 µm or less, and to a method for producing same. The present invention also relates to a thin and in principle unsupported solid oxide cell, comprising at least a porous anode layer, an electrolyte layer and a porous cathode layer, wherein the anode layer and the cathode layer comprise an electrolyte material and a catalyst material, wherein the electrolyte material is doper zirconia, and wherein the overall thickness of the thin reversible cell is about 150 µm or less, and to a method for producing same. The present invention further provides a thin separation membrane, comprising at least a porous anode layer, a membrane layer comprising a mixed conducting material and a porous cathode layer, wherein the anode layer and the cathode layer comprise the mixed conducting material and a catalyst material, and wherein the overall thickness of the thin separation membrane is about 1050 µm or less.

4 Claims, 1 Drawing Sheet

(51) Int. Cl.
    *B01D 67/00*     (2006.01)
    *B01D 69/12*     (2006.01)
    *B01D 71/02*     (2006.01)
    *H01M 4/86*     (2006.01)
    *H01M 4/88*     (2006.01)

(52) U.S. Cl.
CPC ............ *B01D69/12* (2013.01); *B01D 71/024* (2013.01); *H01M 4/8621* (2013.01); *H01M 4/8885* (2013.01); *H01M 4/90* (2013.01); *H01M 4/9033* (2013.01); *H01M 4/9066* (2013.01); *H01M 8/122* (2013.01); *B01D 2323/46* (2013.01); *B01D 2325/08* (2013.01); *B01D 2325/10* (2013.01); *H01M 4/8652* (2013.01); *H01M 4/9016* (2013.01); *H01M 2300/0094* (2013.01); *Y02E 60/521* (2013.01); *Y02E 60/525* (2013.01)

(56) References Cited

U.S. PATENT DOCUMENTS

| | | | |
|---|---|---|---|
| 5,273,837 | A | 12/1993 | Aitken et al. |
| 5,306,411 | A | 4/1994 | Mazanec et al. |
| 5,543,239 | A | 8/1996 | Virkar et al. |
| 5,676,806 | A * | 10/1997 | Van Berkel ......... C04B 41/0072 204/242 |
| 5,693,212 | A | 12/1997 | Mazanec et al. |
| 5,744,015 | A | 4/1998 | Mazanec et al. |
| 6,017,647 | A | 1/2000 | Wallin |
| 6,019,885 | A | 2/2000 | Mazanec et al. |
| 6,257,718 | B1 | 7/2001 | Spencer et al. |
| 6,558,831 | B1 * | 5/2003 | Doshi et al. .................. 429/495 |
| 6,632,554 | B2 * | 10/2003 | Doshi et al. .................. 429/489 |
| 6,682,842 | B1 | 1/2004 | Visco et al. |
| 7,361,424 | B2 | 4/2008 | Jankowski et al. |
| 2002/0106546 | A1 | 8/2002 | Perry et al. |
| 2003/0039874 | A1 * | 2/2003 | Jankowski et al. .............. 429/26 |
| 2003/0082436 | A1 | 5/2003 | Hong et al. |
| 2003/0138685 | A1 | 7/2003 | Jankowski et al. |
| 2004/0018409 | A1 | 1/2004 | Hui et al. |
| 2004/0043273 | A1 | 3/2004 | Jankowksi et al. |
| 2004/0101729 | A1 | 5/2004 | Kearl et al. |
| 2004/0166380 | A1 | 8/2004 | Gorte et al. |
| 2005/0089739 | A1 | 4/2005 | Seccombe, Jr. et al. |
| 2005/0202159 | A1* | 9/2005 | Svoboda ............. H01M 4/8621 427/115 |
| 2005/0271931 | A1 | 12/2005 | Finnerty |
| 2006/0093884 | A1 | 5/2006 | Seabaugh et al. |
| 2006/0197264 | A1 | 9/2006 | Cutler et al. |
| 2006/0257718 | A1 | 11/2006 | Sato et al. |
| 2006/0269813 | A1 | 11/2006 | Seabaugh et al. |
| 2007/0134536 | A1 | 6/2007 | Takase et al. |
| 2007/0134543 | A1 * | 6/2007 | Huang et al. ................... 429/44 |
| 2008/0038611 | A1 | 2/2008 | Sprenkle et al. |
| 2011/0089028 | A1 | 4/2011 | Larsen |

FOREIGN PATENT DOCUMENTS

| | | | |
|---|---|---|---|
| CN | 1636292 | A | 7/2005 |
| EP | 1482584 | A1 | 12/2004 |
| EP | 1928049 | A1 | 6/2008 |
| GB | 1000576 | | 12/1961 |
| JP | 01-227362 | A | 9/1989 |
| JP | 0-5151981 | A2 | 6/1993 |
| JP | 0-7240217 | A2 | 9/1995 |
| JP | 0-9063603 | A2 | 3/1997 |
| JP | 0-9245811 | A2 | 9/1997 |
| WO | 98/49738 | A1 | 11/1998 |
| WO | 02/17420 | A2 | 2/2002 |
| WO | 02/084774 | A2 | 10/2002 |
| WO | 2005/045969 | A2 | 5/2005 |
| WO | WO 2005/045969 | * | 5/2005 ............. H01M 8/02 |
| WO | WO 2005/122300 | A2 | 12/2005 |
| WO | WO 2006/082057 | A2 | 8/2006 |
| WO | 2007/011894 | A1 | 1/2007 |

OTHER PUBLICATIONS

Shao et al. "A High-Performance Cathode for the Next Generation of Solid-Oxide Fuel Cells," *Nature* 431:170-173, 2004, 4 pages.

Moon et al., "Fabrication of Anode-Supported SOFC Single Cells via Tape-Casting of Thin Tapes and Co-Firing," *Journal of the Korean Ceramic Society* 43(12):788-797, 2006.

* cited by examiner

THIN SOLID OXIDE CELL

TECHNICAL FIELD

The present invention relates to a thin and in principle unsupported solid oxide cell (SOC) and a method for preparing same. The present invention further relates to a thin separation membrane which may be used as an oxygen separation membrane, especially for the production of oxygen or synthesis gas, or may be used as a hydrogen separation membrane for the production of high purity hydrogen, and a method for preparing same.

BACKGROUND ART

Solid oxide cells (SOC's) generally include cells designed for different applications, such as solid oxide fuel cells (SOFC's), solid oxide electrolysis cells (SOEC's), or membranes. Due to their common basic structure, the same cell may, for example, be used in SOFC applications as well as SOEC applications. Since in SOFC's fuel is fed into the cell and converted into power, while in SOEC's power is applied to produce fuel, these cells are referred to as 'reversible'.

Solid oxide fuel cells (SOFC's) are well known in the art and come in various designs. Typical configurations include an electrolyte layer being sandwiched between two electrodes. During operation, usually at temperatures of about 500° C. to about 1100° C., one electrode is in contact with oxygen or air, while the other electrode is in contact with a fuel gas.

The most common manufacture processes suggested in the prior art comprise the manufacture of single cells. Generally, a support is provided, on which an anode layer is formed, followed by the application of an electrolyte layer. The so formed half cell is dried and afterwards sintered, in some cases in a reducing atmosphere. Finally, a cathode layer is formed thereon so as to obtain a complete cell. Alternatively, one of the electrode layers or the electrolyte layer may be used as a support layers, having a thickness of about 300 µm or more.

This approach requires a relatively thick support layer to provide mechanical stability of the obtained cell, thereby increasing the overall thickness of the single cells. Further, to obtain high voltage and power, many cells are stacked together in series. However, a large thickness of the individual cells will limit the cell performance and will decrease the power/volume or power/weight of the cell stack. Furthermore, a large thickness also translates into use of more material and thus adds to the overall costs of the stack.

US-A-2004/00115503 discloses an electrochemical device assembly, comprising a porous electrically conductive support layer; a prefabricated electrochemical device layer; and a bonding layer between said support layer and said electrochemical device layer. The conductive support layer has a thickness of from 50 to 750 µm.

US-A-2002/0048699 relates to a SOFC, comprising a ferritic stainless steel support substrate including a porous region and a non-porous region bounding the porous region; a ferritic stainless steel bi-polar plate located under one surface of the porous region of the substrate and being sealingly attached to the non-porous region of the substrate about the porous region thereof; a first electrode layer located over the other surface of the porous region of the substrate; an electrolyte layer located over the first electrode layer; and a second electrode layer located over the electrolyte layer. The substrate preferably has a thickness of from 50 to 250 µm.

US-A-2004/0166380 relates to a method of producing porous electrodes for use in solid oxide fuel cells. The electrodes are formed from a powder of the electrolyte material, and tape cast to form a two-layer green tape. One of said layers will be the later electrode layer, the other layer the electrolyte layer. The obtained green tape is then sintered to form a porous matrix of the electrolyte material near the surface of the first layer and a dense layer of the electrolyte material from the second layer. The final electrode is formed by impregnating the porous portion with electron conducting material.

U.S. Pat. No. 5,273,837 relates to thermal-shock-resistant fuel cell designs comprising flat and corrugated ceramic sheets combined to form channelled structures, the sheets being provided as thin, flexible ceramics. Said flexible, pre-sintered ceramic sheets are used as electrolytes or electrolyte substructures and can be produced as free-standing sheets of high strength but very slight thickness not exceeding about 45 µm. Combined with the electrode layers, the thickness of said substructure does not exceed 150 µm.

However, in view of the increasing importance of solid oxide fuel cells as alternative energy converters, there is a desire for SOFC's with improved performances as compared to the cells provided by the prior art so far.

Similar to the above described solid oxide fuel cell designs, separation membranes comprise a thin membrane layer sandwiched by electrodes.

Such separation membranes may, for example, be used to produce synthesis gas, which is a mixture of CO and $H_2$. Air and methane are supplied at the cathode and anode, respectively, and synthesis gas is obtained via a partial oxidation of the methane. Separation membranes may also used for hydrogen separation for the production of high purity hydrogen. In this case the membrane material must be proton conducting.

Usually, a support layer having a thickness of about 300 µm or more is used to support the membrane and to provide the required strength. Alternatively, one of the electrode layers may be used as the support, being of corresponding thickness. For example, metal electrodes have been proposed as an electrode material since metal is mechanically more robust than a ceramic layer.

However, there is a desire for thin, and in principle unsupported ceramic separation membranes with improved performances as compared to the membranes provided by the prior art so far.

WO-A-2006/082057 relates to a method of producing a reversible solid oxide fuel cell, comprising the steps of 1) providing a metallic support layer; 2) forming a cathode precursor layer on the metallic support layer; 3) forming an electrolyte layer on the cathode precursor layer; 4) sintering the obtained multilayer structure; 5) impregnating the cathode precursor layer so as to form a cathode layer; and 6) forming an anode layer on top of the electrolyte layer.

WO-A-2005/122300 relates to a SOFC cell comprising a metallic support ending in a substantially pure electron conducting oxide, an active anode layer consisting of dope-dceria, ScYSZ, Ni—Fe alloy, an electrolyte layer consisting of co-doped zirconia based on an oxygen ionic conductor, an active cathode layer and a layer of a mixture of LSM and a ferrite as a transition layer to a cathode current collector of single phase LSM.

US-A-2006/025718 discloses a fuel cell electrode material comprising a cermet which comprises metal particles consisting of cobalt and nickel and electrolyte particles consisting of solid oxides, wherein said metal particles comprise 20 to 90 mol % cobalt and the residue of nickel in terms of CoO and NiO, respectively.

U.S. Pat. No. 6,017,647 discloses a composite oxygen electrode/electrolyte structure for a solid state electrochemical device having a porous composite electrode in contact with a dense electrolyte membrane.

GB-A-1000576 relates to a gas electrode for fuel cells which comprises a body of porous sintered electrode material presenting a pair of oppositely disposed surfaces, the electrode material being electrochemically active, a network of gas channels centrally disposed in said body between said surfaces, and a plurality of bridges of porous sintered material integral with and connecting said active surfaces throughout said central gas channels, the gas channels having a cross-sectional area substantially greater than that of the pores of the porous sintered material, and being substantially evenly distributed throughout the electrode between active surfaces.

U.S. Pat. No. 5,273,837 discloses a thermal-shock-resistant fuel cell design comprising flat and corrugated ceramic sheets combined to form channelled structures, the sheets being provided as thin, flexible ceramics and being particularly effective when used as components of compliant electrolyte substructures incorporating the flexible ceramics with fuel cell electrodes and/or current conductors bonded thereto.

SUMMARY

In view of the disadvantages of SOFC's and separation membranes of the prior art having a relatively thick support layer, it is the object of the present invention to provide a thin, reversible and in principle unsupported solid oxide cell, particularly a solid oxide fuel cell, and a method for producing same; and further to provide a thin and in principle unsupported separation membrane, as well as methods for producing same.

Said object is achieved by a thin solid oxide cell (SOFC/SOEC), comprising at least a porous anode layer, an electrolyte layer and a porous cathode layer, wherein the anode layer and the cathode layer comprise an electrolyte material, at least one metal and a catalyst material, and wherein the overall thickness of the thin reversible cell is about 150 µm or less.

Said object is further achieved by a thin solid oxide cell, comprising at least a porous anode layer, an electrolyte layer and a porous cathode layer, wherein the anode layer and the cathode layer comprise an electrolyte material, and a catalyst material, wherein the electrolyte material is doped ceria, and wherein the overall thickness of the thin reversible cell is about 150 µm or less.

Said object is also achieved by a method for producing the above thin solid oxide cells, comprising the steps of:
  providing a first electrode layer;
  applying an electrolyte layer on top of said first electrode layer;
  applying a second electrode layer on top of said electrolyte layer;
  sintering the obtained structure; and
  impregnating the first and second electrode layer with a catalyst material or precursor thereof.

Said object is moreover achieved by a thin separation membrane, comprising at least a porous anode layer, a membrane layer comprising a mixed conducting material and a porous cathode layer, wherein the anode layer and the cathode layer comprise the mixed conducting material and a catalyst material, and wherein the overall thickness of the thin separation membrane is about 150 µm or less.

Said object is finally achieved by a method for producing the above thin separation membrane, comprising the steps of:
  providing a first electrode layer;
  applying a membrane layer on top of said first electrode layer;
  applying a second electrode layer on top of said electrolyte layer;
  sintering the obtained structure; and
  impregnating the first and second electrode layer with a catalyst material or precursor thereof.

Preferred embodiments are set forth in the subclaims.

DETAILED DESCRIPTION OF THE INVENTION

Figure 1:
FIG. 1 illustrates a solid oxide cell in accordance with the present invention, comprising an electrolyte layer 1 and two electrode layers 2 and 3.

The present invention is directed to a thin, and in principal unsupported solid oxide cell, comprising at least a porous anode layer, an electrolyte layer and a porous cathode layer, wherein the anode layer and the cathode layer comprise an electrolyte material, at least one metal and a catalyst material, and wherein the overall thickness of the thin reversible cell is about 150 µm or less.

The present invention is further directed to a thin, and in principal unsupported solid oxide cell, comprising at least a porous anode layer, an electrolyte layer and a porous cathode layer, wherein the anode layer and the cathode layer comprise an electrolyte material, and a catalyst material, wherein the electrolyte material is doped ceria, and wherein the overall thickness of the thin reversible cell is about 150 µm or less.

The solid oxide cell is preferably a solid oxide fuel cell (SOFC). Also preferred is the solid oxide cell being a solid oxide electrolysis cell (SOEC). In a further preferred embodiment, the solid oxide cell is 'reversible', i.e. may be employed in SOFC applications as well as SOEC applications. Thus, the same basic cell design allows for a broad spectrum of applications.

Furthermore, the SOC's and membrane of the present invention are in principle 'unsupported'. No additional support layer is necessary, and the disadvantages outlined above connected with the additional support layer can be effectively avoided. Moreover, since advantageously none of the electrode layers functions as a support layer, i.e. has to have an increased layer thickness in order to function as a support, the overall thickness of the SOC or membrane is reduced to a great extend. This is in sharp contrast to prior art designs also omitting an additional support layer, but instead still requiring one of the electrode layer to have an increased thickness in order to support the cell. For the present invention sufficient strength is achieved via the sandwich trilayer (or multi-layer) comprising electrolyte layer and the backbone structure in the two electrode established using the same material.

The cells may be combined to form a stack to increase the overall output. Thus, the present invention is also directed to such a stack formed from multiple cells connected in series.

In a preferred embodiment, the electrolyte layer of the SOC has a thickness of about 2 to about 20 μm, more preferably of about 6 to about 18 μm.

Further, the cathode layer and/or the anode layer preferably have a thickness of about 65 μm or less, more preferably of about 45 μm or less, and even more preferably of about 40 μm or less.

The overall thickness of the thin solid oxide cell is about 150 μm or less, preferably, 120 μm or less, and more preferably 100 μm or less. Most preferred is the overall thickness being less than 100 μm.

Both electrode precursor layers are porous and have the same composition. Catalytic activity (and in some cases increased electronic conductivity) is achieved by impregnating the two porous electrode precursor layers with suitable materials. Prior to the impregnation the cell is symmetrical. This ensures that the mechanical forces exerted on the electrolyte layer during the temperature cycling in use are symmetrical. Furthermore, since the thermal expansion of the electrode layers is larger than the thermal expansion of the electrolyte layer sandwiched in between, the electrolyte layer is under compression during cooling of the cell. Both advantageously results in an improved mechanical strength of the cell.

Figure 2:
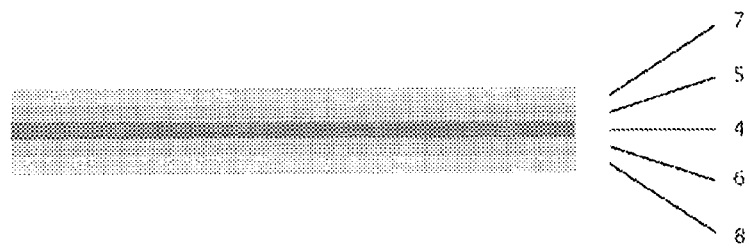
FIG. 2 illustrates a solid oxide cell in accordance with the present invention, comprising an electrolyte layer 4 and electrode layers 5 to 8.

As may be seen from FIG. 1, the electrode layers may be formed as a single layer 2 and 3. However, as may be seen from FIG. 2, the electrode layers may also be formed as a multilayer structure comprising the same number of layers on each side. As shown in FIG. 2, each electrode comprises two layers 5,7 and 6,8. Each electrode may of course have more than two layers if desired.

In one embodiment, the anode layer and the cathode layer both comprise an electrolyte material, at least one metal and a catalyst material. The at least one metal is preferably selected from the group consisting of Ni, a FeCrMx alloy, and a NiCrMx alloy, wherein Mx is selected from the group consisting of Ni, Ti, Ce, Mn, Mo, W, Co, La, Y, Zr, Al, and mixtures thereof. More preferably, the at least one metal is a FeCrMx alloy.

Consequently, the finally obtained electrode structure comprises three independent percolating phases, namely electrolyte material, metal and porosity.

Furthermore, the electrolyte material is preferably selected from the group consisting of doped zirconia, doped ceria, gallates and proton conducting electrolytes.

The catalyst particles needed for the electrode function may also be preferably formed in a chemical reaction between a precursor added by impregnation and elements being exsolved from the metal phase or the electrolyte material in the backbone structure during use or during a specific heating cycle in controlled atmosphere. In a preferred embodiment Mn, Ni or Co is supplied to the catalyst particles from the metal.

The electrode layers advantageously comprise an electrolyte material, at least one metal and a catalyst material. The electrode layers comprising said electrolyte material thus provide ionic conductivity and, at the same time, provide good bonding to the electrolyte layer. The metal on the other hand provides electronic conductivity and increases the thermal expansion coefficient of the electrode layers. Furthermore, since the metal is part of the sintered electrode layers, there is no need of percolating the catalyst material in the final cell.

Moreover, advantageously, the catalyst material may be formed as very fine particles during the impregnation step since the metal provides percolating electronic conductivity to the electrode layer. Thus, a disadvantageous coarsening of the catalyst particles can be efficiently reduced or avoided. Additionally, less amount of catalyst is needed, further reducing the manufacturing costs.

In another embodiment, the electrolyte material of the thin solid oxide cell specifically comprises doped ceria. In this case, it is not mandatory for the anode layer and the cathode layer to comprise at least one metal. Of course, metal may be added if desired, depending on the application purpose.

The preferred embodiments described above of course also apply to the specific embodiment comprising doped ceria as the electrolyte material, but wherein it is not mandatory for the anode layer and the cathode layer to comprise at least one metal.

The above described thin solid oxide cell, particularly thin reversible solid oxide fuel cell, is obtainable by a method comprising the steps of:
  providing a first electrode layer;
  applying an electrolyte layer on top of said first electrode layer;
  applying a second electrode layer on top of said electrolyte layer;
  sintering the obtained structure; and
  impregnating the first and second electrode layer with a catalyst material or precursor thereof.

Preferably, the first and second electrode layer and said electrolyte layer are manufactured independently, for example by tape-casting, and are subsequently laminated, i.e. by rolling, to form the thin solid oxide fuel cell.

Also preferred is the steps of tape casting the electrode layers and electrolyte layer being carried out by co-casting of the respective layers directly on top of each other. This can be done by tape casting including "wet on dry" casting and "wet on wet" casting. It is further preferred to employ wet on wet tape casting.

This ensures excellent bonding of the two layers on each other. Furthermore, a drying step may be omitted in wet on wet casting, thus making the process more time and in return cost efficient. Co-casting advantageously results in a large reduction in production costs.

Figure 3:
FIG. 3 illustrates a solid oxide cell in accordance with the present invention, comprising two electrolyte layers 9 and 10 and two electrode layers 11 and 12.

In another preferred embodiment, the electrolyte layer of the thin reversible solid oxide fuel cell is a multilayer structure comprising at least two layers, as illustrated by layers 9 and 10 in FIG. 3. The overall thickness of said multilayer structure is still about 2 to about 20 μm, more preferably of about 6 to about 18 μm, as mentioned above. Thus, the electrolyte layer may, for example, be formed from two layers each having a thickness of about 5 μm.

In a further preferred embodiment, the electrode layers may also be multilayer structures comprising at least two layers each, as illustrated by electrode layers 5,7 and 6,8 in FIG. 2, having the same overall thickness of about 65 μm or less, more preferred of about 40 μm or less, respectively. More preferred is a multilayer structure wherein the at least two layers have a different thermal expansion coefficient (TEC). This may, for instance, be achieved by a different amount of metal in the respective layers.

Preferably, the TEC of the outer electrode layer 7,8 is smaller than the TEC of the electrode layers 5,6 being in contact with the electrolyte layer 4. Electrolyte layer 4 has the lowest TEC.

In a more preferred embodiment, the cathode layer and the anode layer comprise two different layers each, as shown in FIG. 2, wherein the respective layers directly in contact with the electrolyte layer have identical thermal expansion coefficient the value of which is larger than the thermal expansion coefficient of the electrolyte layer, and larger than the thermal expansion coefficient of the respective second layers of the electrodes. Furthermore, the thermal expansion coefficients of the respective second layers are also identical.

If the cathode layer and the anode layer comprise more than two layers each, each further layer has a thermal expansion coefficient being smaller than the one of the layer on the side closer to the electrolyte layer, while maintaining an overall symmetrical cell structure.

Since the final cell structure is a symmetrical structure, with the electrolyte layer being sandwiched by the at least two electrode layers as described above, the respective layers having a smaller TEC than the two layers in contact with the electrolyte layer will be under compression during cooling. This is due to the outermost layer on each side of the electrolyte having a smaller thermal expansion coefficient, as compared to the inner layers. Consequently, the cell advantageously exhibits an improved stability, resulting in a longer cell life.

Figure 4:
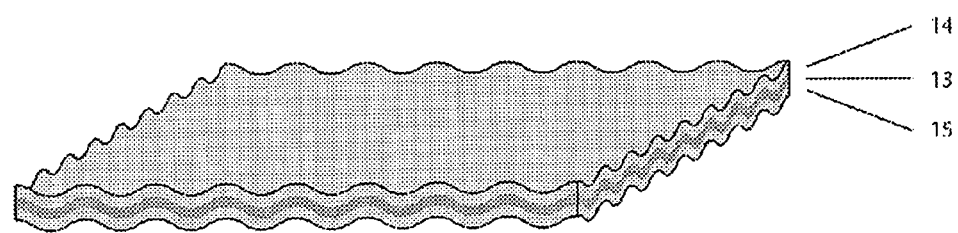
FIG. 4 illustrates a patterned solid oxide cell in accordance with the present invention, comprising an electrolyte layer 13 and two electrode layers 14 and 15.

In a further preferred embodiment, the manufactured cell structure is profiled prior to sintering so as to obtain a patterned structure. Patterned structures include a ribbon structure or egg tray structure, as illustrated by FIG. 4. The pattern may advantageously act as gas channels in the cell during later use. Said pattern contributes to the overall stiffness and handling strength of the cell. The profiling of the cell further increases the power/volume performance of the stack which is highly advantageous in certain applications.

Further, in this case, the respective interconnects separating the individual cells which are stacked in series may be flat foils and do not have to have a structure including said gas channels. This reduces the costs of the interconnector and makes the overall production method more cost effective.

In the method the present invention, alternatively a combination of co-casting and laminating the layers may be employed. For example, if the above described multilayer electrode is used, the respective electrode multilayer structures may be co-cast and then laminated to the electrolyte layer, which is preferred. Of course, other combinations of laminating and co-casting the respective layers is possible. For example, if a multilayer electrolyte is used, the electrolyte layers may be co-cast and then laminated to the electrode layers.

After the sintering step of the multilayer structure, the electrode layers are impregnated with a catalyst or precursor thereof. This can be done by masking the first electrode layer, impregnating the unmasked second electrode layer, followed by demasking the first and masking the second, now impregnated electrode layer, then impregnating the second electrode layer, and finally demasking the first electrode layer.

Advantageously, the catalyst material may be formed as very fine particles during the impregnation step since the metal provides electronic conductivity. Thus, a disadvantageous coarsening of the catalyst particles, which otherwise occurs when sintering the cell, can be efficiently reduced or avoided. Additionally, less amount of catalyst is needed, further reducing the manufacturing costs of the cell.

Also, less impregnation of a current collection material is needed, also contributing to the overall performance increase.

Preferably, the catalyst or precursor thereof for the impregnation of the first or second electrode layer which will function as the cathode layer is selected from the group consisting of manganites, ferrites, cobaltites and nickelates or mixtures thereof. Examples include lanthanum strontium manganate, lanthanide strontium iron cobalt oxide, $(Gd_{1-x}(Ca_x)Fe_{1-y}Co_yO_3$, $(La_{1-x}Sr_x)MnO_{3-\delta}$, $(Ln_{1-x}Sr_x)MnO_{3-\delta}$, $(La_{1-x}Sr_x)Fe_{1-y}Co_yO_{3-\delta}$, $(Ln_{1-x}Sr_x)Fe_{1-y}Co_yO_{3-\delta}$, $(Y_{1-x}Ca_x)Fe_{1-y}Co_yO_{3-\delta}$, $(Gd_{1-x}Sr_x)Fe_{1-y}Co_yO_{3-\delta}$, $(Gd_{1-x}Sr_x)Fe_{1-y}Co_yO_3$, $(Gd_{1-x}Ca_x)Fe_{1-y}Co_yO_{3-\delta}$, $(Y,Ca)Fe_{1-y}Co_yO_{3-\delta}$, $(Y_{1-x}Ca_x)Fe_{1-y}Co_yO_3$ or mixtures thereof. Ln=lanthanides.

In the above formulae, x is preferably from about 0 to 1, more preferably from about 0.1 to 0.5, and most preferably from 0.2 to 0.3. Y is preferably from about 0 to 1, more preferably from about 0.1 to 0.5, and most preferably from 0.2 to 0.3.

Along with the above mentioned catalysts, electrolyte materials such as doped zirconia or doped ceria may also be impregnated.

It is also preferred that the catalyst or precursor thereof for the impregnation of the first or second electrode layer which will function as the anode layer is selected from the group consisting of Ni, $Fe_xNi_{1-x}$, alloys and a mixture of Ni and doped ceria/zirconia or a mixture of Cu and Cu and doped zirconia/ceria. Alternatively $Ma_sTi_{1-x}Mb_xO_{3-\delta}$, Ma=Ba, Sr, Ca; Mb=V, Nb, Ta, Mo, W, Th, U; $0 \leq s \leq 0.5$; or $LnCr_{1-x}M_xO_{3-\delta}$, M=T, V, Mn, Nb, Mo, W, Th, U may be used. X is preferably from about 0 to 1, more preferably from about 0.1 to 0.5, and most preferably from 0.2 to 0.3. Y is preferably from about 0 to 1, more preferably from about 0.1 to 0.5, and most preferably from 0.2 to 0.3.

The sintering step prior to impregnation is preferably carried out at a temperature of from about 900° C. to about 1500° C., preferably from about 1000° C. to about 1400° C.

Additions may be added to the layer compositions if needed, such as pore formers, sintering additives, solvents and the like as is well known to the skilled person.

The present invention is also directed to a thin and in principle unsupported separation membrane, comprising at least a porous anode layer, a membrane layer comprising a mixed conducting material and a porous cathode layer, wherein the anode layer and the cathode layer comprise the mixed conducting material and a catalyst material, and wherein the overall thickness of the thin separation membrane is about 150 μm or less.

The thin separation membrane can be used as an oxygen separation membrane, especially for the production of oxygen or synthesis gas, in case the membrane is designed as an oxygen ion conductor. The membrane may, if instead based on a proton conducting material alternatively be used as a hydrogen separation membrane, especially for the production of high purity hydrogen for e.g. storage or use in a low-temperature fuel cell.

In a preferred embodiment, the anode layer and the cathode layer comprise at least one metal. The at least one metal is the same as outlined in detail above for the SOC.

In a further preferred embodiment, the mixed conducting material is preferably selected from the group consisting of doped ceria, gallates and proton conducting electrolytes. More preferred is the electrolyte being doped ceria. Preferred dopants for the doped ceria are Sm or Gd.

One advantage of the component comprising doped ceria as the mixed conducting material of the membrane layer and electrode layers is that said structure may be used as a high temperature oxygen separation membrane at temperatures of from about 550 to about 1000° C. due to the increase of the electronic conductivity of the ceria. However, below about 550° C., ceria exhibits mainly ionic conductivity, and thus said component can be used as a reversible SOFC at said temperatures instead.

In another preferred embodiment, the membrane layer comprises doped ceria as the mixed conducting material. In a more preferred embodiment, the anode layer and cathode layer comprise at least one metal when the membrane layer comprises doped ceria.

All preferred embodiments described above for the electrolyte layer, the electrode layers and the materials thereof also apply to the membrane layer, the electrode layers and the materials thereof of the separation membrane.

The thin separation membrane is obtainable by a method comprising the steps of:
providing a first electrode layer;
applying a membrane layer (a gastight layer of mixed conducting material) on top of said first electrode layer;
applying a second electrode layer on top of said membrane layer;
sintering the obtained structure; and
impregnating the first and second electrode layer with a catalyst material or precursor thereof.

All preferred embodiments described above for the method for producing the SOFC and materials thereof also apply to the method for producing the thin separation membrane.

In the following, the present invention will be further illustrated with reference to examples. The invention is, however, not restricted thereto.

EXAMPLES

Example 1

Manufacture of a Thin Solid Oxide Cell

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises SYSZ (scandia and yttria doped stabilized zirconia) and FeCr powder in a 1:1 volume ratio. The green thickness is about 40 µm. The sintered porosity of the layer is about 50%.

Layer 2: The suspension is based on SYSZ powder with $Al_2O_3$ as sintering additive. The green thickness of the foil is about 15 µm. The sintered density of the layer is >96% of the theoretical density.

The second step comprises the lamination of the above mentioned foils into a layered structure comprising an electrolyte layer (1) sandwiched between two electrode precursor layers (2, 3), as shown in FIG. 1. The lamination is performed by the use of heated rolls in a double roll set-up and takes place in one pass.

In the third step, the laminated tapes are cut into square pieces. This is done by knife punching resulting in sintered areas in the range of 12×12 to 30×30 $cm^2$.

The fourth step comprises sintering. The laminate is heated at with a temperature increase of about 50° C./h to about 500° C. under flowing air. After 2 hours of soaking, the furnace is evacuated and $H_2$ introduced. After 3 hours soaking time, the furnace is heated to about 1200° C. with a temperature increase of 100° C./h and left for 5 hours before cooling to room temperature.

The fifth step is the impregnation of the cathode. The sintered cell is closed on one side. A nitrate solution of La, Sr, Co and Fe is vacuum infiltrated into the porous structure. The infiltration is performed six times with an intermediate heating step for decomposition of the nitrates. The resulting composition of the impregnated perovskite cathode is: $(La_{0.6}Sr_{0.4})(Co_{0.2}Fe_{0.8})O_{3-\delta}$.

In the sixth step the anode is impregnated. The cathode impregnated side is closed. A nitrate solution of Ni, Ce and Gd is vacuum infiltrated into the porous structure. The infiltration is performed five times with an intermediate heating schedule between each infiltration for decomposition of the impregnated nitrates. The resulting composition of the impregnated anode part is 40 vol % Ni and 60 vol % $(Ce_{0.9}Gd_{0.1})O_{2-\delta}$ (after reduction of NiO).

The so formed cell has a thickness of about 90 µm and is ready to be built into a stack of cells. No heat treatment prior to stacking is required.

Example 2

Manufacture of a Thin Solid Oxide Cell

The cell is produced as outlined above for Example 1, with the exception that in step five the cathode is impregnated. The sintered cell is closed on one side. A colloidal suspension of $(La_{0.6}Sr_{0.4})(Co_{0.2}Fe_{0.8})O_{3-\delta}$ and $(Ce_{0.9}Sm_{0.1})O_{2-\delta}$ is vacuum infiltrated into the porous structure. The infiltration is performed six times with an intermediate heating step.

The obtained cell has a thickness of about 95 µm and is ready to be built into a stack of cells. No heat treatment prior to stacking is required.

Example 3

Manufacture of a Thin Solid Oxide Cell

The manufacturing is carried out as described in Example 1 for steps one to four.

The fifth step is the impregnation of the cathode. The sintered cell is closed on one side by a polymeric seal. A colloidal suspension of $(La_{0.75}Sr_{0.25})MnO_{3-\delta}$ is vacuum infiltrated into the porous structure. The infiltration is performed six times with an intermediate drying between each infiltration.

The cell is completed as described in Example 1. The obtained cell has a thickness of about 100 µm and is ready to be built into a stack of cells. No heat treatment prior to stacking is required.

Example 4

Manufacture of a Thin Solid Oxide Cell

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension is based on $(Ce_{0.9}Gd_{0.1})O_{2-\delta}$ with FeCr metal powder using charcoal as a pore-former. The green thickness is about 40 μm. The sintered porosity of the layer is about 50%.

Layer 2: The suspension is based on $(Ce_{0.9}Gd_{0.1})O_{2-\delta}$ powder. The green thickness of the foil is about 12 μm. The sintered density of the layer is >96% of the theoretical density.

The second step comprises the lamination of the above mentioned foils into a layered structure comprising an electrolyte layer (1) sandwiched between two electrode precursor layers (2, 3), as shown in FIG. 1. The lamination is performed by the use of heated rolls in a double roll set-up and takes place in one pass.

In the third step, the laminated tapes are cut into square pieces. This is done by knife punching resulting in sintered areas in the range of 12×12 to 30×30 cm².

The fourth step comprises sintering. The laminate is heated at a temperature increase of about 50° C./h to about 500° C. under flowing air. After 2 hours of soaking, the furnace is evacuated and $H_2$ introduced. After 3 hours soaking time, the furnace is heated to about 1200° C. with a temperature increase of 100° C./h and left for 5 hours before cooling to room temperature.

The fifth step is the impregnation of the cathode. The sintered cell is closed on one side. A nitrate solution of La, Sr, Co and Fe is vacuum infiltrated into the porous structure. The infiltration is performed six times with an intermediate heating step for decomposition of the nitrates. The resulting composition of the impregnated perovskite cathode is: $(La_{0.6}Sr_{0.4})(Co_{0.2}Fe_{0.8})O_{3-\delta}$.

In the sixth step the anode is impregnated. The cathode impregnated side is closed. A nitrate solution of Ni, Ce and Gd is vacuum infiltrated into the porous structure. The infiltration is performed five times with an intermediate heating schedule between each infiltration for decomposition of the impregnated nitrates. The resulting composition of the impregnated anode part is 40 vol % Ni and 60 vol % $(Ce_{0.9}Gd_{0.1})O_{2-\delta}$ (after reduction of NiO).

The so formed cell is about 100 μm thick and ready to be build into a stack of cells. No heat treatment prior to stacking is required.

Example 5

Manufacture of a Thin Solid Oxide Cell Having a Very Thin Electrolyte Layer

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises SYSZ and FeCr powder in a 1:1 volume ratio. The green thickness is about 40 μm. The sintered porosity of the layer is about 50%.

Layer 2: The suspension is based on $Zr_{0.78}Sc_{0.2}Y_{0.02}O_{2-\delta}$ powder. The green thickness of the foil is about 5 μm. The sintered density of the layer is >96% of the theoretical density.

The cell is completed as described in Example 1. The so formed cell is about 80 μm thick and ready to be build into a stack of cells. No heat treatment prior to stacking is required.

Example 6

Manufacture of a Thin Solid Oxide Cell Having Multi Layer Electrodes

The first step comprises tape-casting of three layers; two metal containing electrode precursor layers (layer 1 and 2) and one electrolyte layer (layer 3). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried. The relative thermal expansion coefficients (TEC) of the layers are $TEC_{layer3} < TEC_{layer1} < TEC_{layer2}$.

Layer 1: The suspension comprises SYSZ and FeCr powder in a 1:1 volume ratio. 20 vol % graphite is used as pore former. The green thickness is about 30 μm. The sintered porosity of the layer is about 50%.

Layer 2: The suspension is based on SYSZ and FeCr powder in a 1:1.1 volume ratio. 15% graphite is used as a pore-former. The green thickness of the foil is about 25 μm. The sintered porosity of the layer is about 50%.

Layer 3: The suspension is based on SYSZ powder. The green thickness of the foil is about 10 μm. The sintered density of the layer is >96% of the theoretical density.

The second step comprises the lamination of the above mentioned foils into a layered structure comprising an electrolyte layer (sandwiched between two electrode precursor layers on each side in the order Layer 1—Layer 2—Layer 3—Layer 2—Layer 1. This layer structure corresponds to layers 4 to 8 as shown in FIG. 2. The lamination is performed by the use of heated rolls in a double roll set-up and takes place in one pass.

In the third step, the laminated tapes are cut into square pieces. This is done by knife punching of samples with an area of about 600 cm².

The cell is completed as described in Example 1. The obtained cell is about 120 μm thick and ready to be build into a stack of cells. No heat treatment prior to stacking is required.

Example 7

Manufacture of a Thin Solid Oxide Cell Having a Multilayer Electrolyte

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises SYSZ and FeCr powder in a 1:1 volume ratio. The green thickness is about 40 μm. The sintered porosity of the layer is about 50%.

Layer 2: The suspension is based on SYSZ powder. The green thickness of the foil is about 3 μm (sintered thickness is about 2 μm). The sintered density of the layer is >96% of the theoretical density.

The second step comprises the lamination of the above mentioned foils into a layered structure comprising two electrolyte layers (9, 10) sandwiched between two electrode precursor layers (11, 12), as shown in FIG. 3. The lamination is performed by the use of heated rolls in a double roll set-up and takes place in one pass.

In the third step, the laminated tapes are cut into square pieces. This is done by knife punching resulting in sintered areas in the range of 12×12 to 30×30 cm$^2$.

The fourth step comprises sintering. The laminate is heated at an increase of about 50° C./h to about 500° C. under flowing air. After 2 hours of soaking, the furnace is evacuated and H$_2$ introduced. After 3 hours soaking time, the furnace is heated to about 1200° C. with a temperature increase of 100° C./h and left for 5 hours before cooling to room temperature.

The fifth step is the impregnation of the cathode. The sintered cell is closed on one side by a rubber seal. A nitrate solution of Gd, Sr, Co and Fe is vacuum infiltrated into the porous structure. The infiltration is performed six times with an intermediate heating step for decomposition of the nitrates. The resulting composition of the impregnated perovskite cathode is: $(Gd_{0.6}Sr_{0.4})(Co_{0.2}Fe_{0.8})O_{3-\delta}$.

In the sixth step the anode is impregnated. The cathode impregnated side is closed by a rubber seal. A nitrate solution of Cu, Ni, Ce and Gd is vacuum infiltrated into the porous structure. The infiltration is performed six times with an intermediate heating schedule between each infiltration for decomposition of the impregnated nitrates. The resulting composition of the impregnated anode part is 4 vol % Cu, 38 vol % Ni and 58 vol % $(Ce_{0.9}Gd_{0.1})O_{3-\delta}$ (after reduction of NiO).

The obtained cell is about 100 μm thick and ready to be build into a stack of cells. No heat treatment prior to stacking is required.

Example 8

Manufacture of a Thin Solid Oxide Cell with a Patterned Profiled Structure

Steps one and two are carried out as described in Example 1.

In the third step, the laminated tapes are cut into pieces. This is done by knife punching resulting in sintered areas in the range up to 40×40 cm$^2$.

In the fourth step the laminated structures are given an egg tray pattern profiled structure by pressing, electrolyte layer (13) and two electrode precursor layers (14,15), as shown in FIG. 4.

The fifth step comprises sintering. The laminate is heated at an increase of about 50° C./h to about 500° C. under flowing air. After 2 hours of soaking, the furnace is evacuated and H$_2$ introduced. After 3 hours soaking time, the furnace is heated to about 1200° C. with a temperature increase of 100° C./h and left for 5 hours before cooling to room temperature.

The sixth step is the impregnation of the cathode. The sintered cell is closed on one side by a rubber seal. A nitrate solution of Gd, Sr, Co and Fe is vacuum infiltrated into the porous structure. The infiltration is performed six times with an intermediate heating step for decomposition of the nitrates. The resulting composition of the impregnated perovskite cathode is: $(Gd_{0.6}Sr_{0.4})(Co_{0.2}Fe_{0.8})O_{3-\delta}$.

In the seventh step the anode is impregnated. The cathode impregnated side is closed by a rubber seal. A nitrate solution of Ni, Ce and Gd is vacuum infiltrated into the porous structure. The infiltration is performed seven times with an intermediate heating schedule between each infiltration for decomposition of the impregnated nitrates. The resulting composition of the impregnated anode part is 50 vol % Ni and 50 vol % $(Ce_{0.9}Gd_{0.1})O_{2-\delta}$ (after reduction of NiO).

The obtained cell is about 95 μm thick and ready to be build into a stack of cells. No heat treatment prior to stacking is required.

Example 9

Manufacture of a Ceria—Low T SOFC, High T Oxygen Separation Membrane

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises pre-calcined $(Ce_{0.9}Gd_{0.1})O_{3-\delta}$ and 10 vol % charcoal as a pore-former. The green thickness is about 40 μm. The sintered porosity of the layer is about 50%.

Layer 2: The suspension is based on $(Ce_{0.9}Gd_{0.1})O_{3-\delta}$ powder. The green thickness of the foil is about 12 μm. The sintered density of the layer is >96% of the theoretical density.

Step two to four are carried out as described in Example 1.

The fifth step is the impregnation of the cathode. The sintered cell is closed on one side by a rubber seal. A nitrate solution of La, Sr, Co and Fe is vacuum infiltrated into the porous structure. The infiltration is performed six times with an intermediate heating step for decomposition of the nitrates. The resulting composition of the impregnated perovskite cathode is: $(La_{0.6}Sr_{0.4})(Co_{0.2}Fe_{0.8})O_{3-\delta}$.

In the sixth step the anode is impregnated. The cathode impregnated side is closed by a rubber seal. A colloidal suspension of NiO and $(Sr_{0.8}La_{0.2})(Nb_{0.1}Ti_{0.9})O_{3-\delta}$ is vacuum infiltrated into the porous structure. The infiltration is performed five times with an intermediate drying between each infiltration. The volume ratio of NiO:SLNT is 1:10.

The obtained membrane is about 100 μm thick and ready to be build into a stack of cells. No heat treatment prior to stacking is required.

Example 10

Manufacture of a Ceria—Low T SOFC, High T Oxygen Separation Membrane

The membrane was obtained as described in Example 9, with the exception that a mixture of $(Ce_{0.9}Gd_{0.1})O_{2-\delta}$ and FeCr powder in a 1:1 volume is used in layer 1.

Example 11

Manufacture of a Ceria—Low T SOFC, High T Oxygen Separation Membrane

The first step comprises co-casting of a three layered structure (layer 1 and 3—electrode precursor layer, and layer 2—electrolyte layer) with intermediate drying after tape-casting of each layer. Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up as described below and the cast is subsequently dried.

Suspension 1, Layer 1 and 3: The suspension comprises pre-calcined $(Ce_{0.9}Gd_{0.1})O_{2-\delta}$ and 10 vol % charcoal as a pore-former. The green thickness is about 40 µm. The sintered porosity of the layer is about 50%.

Suspension 2, Layer 2: The suspension is based on $(Ce_{0.9}Gd_{0.1})O_{2-\delta}$ with $Co_3O_4$ as sintering additive The green thickness of the foil is about 12 µm. The sintered density of the layer is >96% of the theoretical density.

Layer 1 is tape-cast onto a polymeric foil. After drying, Layer 2 is tape-cast directly onto Layer 1, and after a subsequent drying Layer 3 (Suspension 1) is tape-cast directly onto the two layered structure comprising Layer 1 of Layer 2.

In the second step, the co-cast tapes are cut into square pieces. This is done by knife punching resulting in sintered areas in the range of 200-600 cm$^2$.

The third step comprises sintering. The laminate is heated at an increase of about 50° C./h to about 500° C. under flowing air. After 2 hours of soaking, the furnace is to about 1150° C. with a temperature increase of 100° C./h and left for 5 hours before cooling to room temperature.

The fifth step is the impregnation of the cathode. The sintered cell is closed on one side. A nitrate solution of La, Sr and Co is vacuum infiltrated into the porous structure. The infiltration is performed six times with an intermediate heating step for decomposition of the nitrates. The resulting composition of the impregnated perovskite cathode is: $(La_{0.6}Sr_{0.4})CoO_{3-\delta}$.

In the sixth step the anode is impregnated. The cathode impregnated side is closed. A nitrate solution of Ni, Ce and Gd is vacuum infiltrated into the porous structure. The infiltration is performed five times with an intermediate heating schedule between each infiltration for decomposition of the impregnated nitrates. The resulting composition of the impregnated anode part is 50 vol % Ni and 50 vol % $(Ce_{0.9}Gd_{0.1})O_{2-\delta}$ (after reduction of NiO).

The obtained membrane is about 100 µm thick and ready to be build into a stack of cells. No heat treatment prior to stacking is required.

Example 12

Manufacture of a (Ceria—Low T SOFC, High T Oxygen Separation Membrane

The first step comprises co-casting of a three layered structure (layer 1 and 3—electrode precursor layer, and layer 2—electrolyte layer) without intermediate drying. Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up as described below and the cast is subsequently dried.

Suspension 1, Layer 1 and 3: The suspension comprises pre-calcined $(Ce_{0.9}Gd_{0.1})O_{2-\delta}$ and 10 vol % charcoal as a pore-former. The green thickness is about 40 µm. The sintered porosity of the layer is about 50% with.

Suspension 2, Layer 2: The suspension is based on $(Ce_{0.9}Gd_{0.1})O_{2-\delta}$. The green thickness of the foil is about 12 µm. The sintered density of the layer is >96% of the theoretical density.

Three doctor blade set-ups are place in series on a polymeric film and the three layers are tape-cast directly onto one another. Layer 1 (Suspension 1)—Layer 2 (Suspension 2) and Layer 3 (Suspension 1).

In the second step, the co-cast tapes are cut into square pieces. This is done by knife punching resulting in sintered areas in the range of 200-600 cm$^2$.

The third step comprises sintering. The laminate is heated at an increase of about 50° C./h to about 500° C. under flowing air. After 2 hours of soaking, the furnace is heated to about 1150° C. with a temperature increase of 100° C./h and left for 5 hours before cooling to room temperature.

The fifth step is the impregnation of the cathode. The sintered cell is closed on one side. A nitrate solution of La, Sr and Co is vacuum infiltrated into the porous structure. The infiltration is performed six times with an intermediate heating step for decomposition of the nitrates. The resulting composition of the impregnated perovskite cathode is: $(La_{0.6}Sr_{0.4})CoO_{3-\delta}$.

In the sixth step the anode is impregnated. The cathode impregnated side is closed. A nitrate solution of Ni, Ce and Gd is vacuum infiltrated into the porous structure. The infiltration is performed five times with an intermediate heating schedule between each infiltration for decomposition of the impregnated nitrates. The resulting composition of the impregnated anode part is 50 vol % Ni and 50 vol % $(Ce_{0.9}Gd_{0.1})O_{2-\delta}$ (after reduction of NiO).

The obtained membrane is about 100 µm thick and ready to be build into a stack of cells. No heat treatment prior to stacking is required.

Example 13

Manufacture of a Thin Solid Oxide Cell

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises pre-calcined (LSGM1520=$La_{0.85}Sr_{0.15}Ga_{0.8}Mg_{0.2}O_3$ or LSGM2015) and 20 vol % graphite as a pore-former. The green thickness is about 40 µm. The sintered porosity of the layer is about 50%.

Layer 2: The suspension is based on $(La_{0.85}Sr_{0.15}Ga_{0.8}Mg_{0.2}O_3)$. powder using charcoal as a pore-former. The green thickness of the foil is about 12 µm. The sintered density of the layer is >96° A) of the theoretical density.

The second step comprises the lamination of the above mentioned foils into a layered structure comprising an electrolyte layer (1) sandwiched between two electrode precursor (2, 3) layers, as shown in FIG. 1. The lamination is performed by the use of heated rolls in a double roll set-up and takes place in one pass.

In the third step, the laminated tapes are cut into square pieces. This is done by knife punching resulting in sintered areas in the range of 12×12 to 30×30 cm$^2$.

The fourth step comprises sintering. The laminate is heated at an increase of about 50° C./h to about 500° C.

under flowing air. After 2 hours of soaking, the furnace is to about (1400° C.) with a temperature increase of 100° C./h and left for 4 hours before cooling to room temperature.

The fifth step is the impregnation of the cathode. The sintered cell is closed on one side by a rubber seal. A nitrate solution of La, Sr, Fe, Co is vacuum infiltrated into the porous structure. The infiltration is performed six times with an intermediate heating step for decomposition of the nitrates. The resulting composition of the impregnated cathode is: $(La_{0.6}Sr_{0.4})(Co_{0.2}Fe_{0.8})O_{3-\delta}$.

In the sixth step the anode is impregnated. The cathode impregnated side is closed by a rubber seal. A nitrate solution of La, Sr, Mn and Cr is vacuum infiltrated into the porous structure. The infiltration is performed five times with an intermediate heating schedule between each infiltration for decomposition of the impregnated nitrates. The resulting composition of the impregnated anode part $La_{0.75}Sr_{0.25}Cr_{0.5}Mn_{0.5}O_{3-\delta}$ The obtained cell is about 100 μm thick and ready to be build into a stack of cells s. No heat treatment prior to stacking is required.

Example 14

Manufacture of a Thin Solid Oxide Cell (Proton Conductor)

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises pre-calcined $SrCe_{0.95}Yb_{0.05}O_{3-\delta}$ and 20 vol % graphite as a pore-former. The green thickness is about 40 μm. The sintered porosity of the layer is about 50%.

Layer 2: The suspension is based on $SrCe_{0.95}Yb_{0.05}O_{3-\delta}$ powder The green thickness of the foil is about 15 μm. The sintered density of the layer is >96% of the theoretical density.

The second step comprises the lamination of the above mentioned foils into a layered structure comprising an electrolyte layer (1) sandwiched between two electrode precursor layers (2, 3), as shown in FIG. 1. The lamination is performed by the use of heated rolls in a double roll set-up and takes place in one pass.

In the third step, the laminated tapes are cut into square pieces. This is done by knife punching resulting in sintered areas in the range of 12×12 to 30×30 cm².

The fourth step comprises sintering. The laminate is heated at an increase of about 50° C./h to about 500° C. under flowing air. After 2 hours of soaking, the furnace is to about (1600° C.) with a temperature increase of 100° C./h and left for 4 hours before cooling to room temperature.

The fifth step is the impregnation of the cathode. The sintered cell is closed on one side by a rubber seal. A colloidal suspension of Pd or Pt is vacuum infiltrated into the porous structure. The infiltration is performed six times with an intermediate heating step In the sixth step the anode is impregnated. The cathode impregnated side is closed by a rubber seal. A colloidal suspension of Pd or Pt is vacuum infiltrated into the porous structure. The infiltration is performed six times with an intermediate heating step.

The obtained cell is about 100 μm thick and ready to be build into a stack of cells. No heat treatment prior to stacking is required.

Example 15

Manufacture of a Thin Proton Membrane Cell (Proton Membrane)

The first step comprises tape-casting of two layers (layer 1—electrode precursor layer, and layer 2—electrolyte layer). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade set-up and the tapes are subsequently dried.

Layer 1: The suspension comprises Sr-zirconate and $Fe_2Cr$ powder in a 1:1 volume ratio. The green thickness is about 40 μm. The sintered porosity of the layer is about 50% with a pore size in the range of 1-2 μm.

Layer 2: The suspension is based on Sr-zirconate powder. The green thickness of the foil is about 15 μm. The sintered density of the layer is >96% of the theoretical density.

The second step comprises the lamination of the above mentioned foils into a layered structure comprising an electrolyte layer (1) sandwiched between two electrode precursor layers (2, 3), as shown in FIG. 1. The lamination is performed by the use of heated rolls in a double roll set-up and takes place in one pass.

In the third step, the laminated tapes are cut into square pieces. This is done by knife punching resulting in sintered areas in the range of 200-600 cm².

The fourth step comprises sintering. The laminate is heated at an increase of about 50° C./h to about 500° C. under flowing air. After 2 hours of soaking, the furnace is evacuated and $H_2$ introduced. After 3 hours soaking time, the furnace is heated to about 1300° C. with a temperature increase of 100° C./h and left for 5 hours before cooling to room temperature.

The fifth step is the impregnation of the electrodes. A colloidal suspension of Pd or Pd—Ag alloy is vacuum infiltrated into the porous structures. The infiltration is performed five times with an intermediate heating schedule between each infiltration.

The so formed membrane is about 90 μm thick and ready to be built into a stack of cells. No heat treatment prior to stacking is required.

The present invention provides a thin, preferably reversible and in principle unsupported solid oxide cell, particularly solid oxide fuel cell, which is very thin, i.e. has an overall thickness of about 150 μm or less. Due to the very thin cell, less material is needed for a given rated power, reducing the manufacturing costs of the cell.

Due to the symmetrical structure and compression of the electrolyte layer and possibly the outer layer in case of a multilayer structure, improved mechanical stability of the cell can be achieved.

The electrode layers advantageously comprise an electrolyte material, in one embodiment at least one metal and a catalyst material. Since metal is in this case part of the sintered electrode layers, electronic conductivity is provided without the need of percolating the catalyst material.

Further, in this case the electronic conductivity of the electrode layers is higher as compared to electrode layers which do not contain metal and are only impregnated after the sintering, leading to an overall improved performance of the cell.

Moreover, the catalyst material may be formed as very fine particles during the impregnation step since the metal provides electronic conductivity. Thus, a disadvantageous coarsening of the catalyst particles during sintering of the cell can be efficiently reduced or avoided. Additionally, less catalyst is needed, further reducing the manufacturing costs.

Furthermore, less impregnation of a current collection material is needed, also contributing to the performance increase.

Finally, redox-stability of the anode may be obtained as the nickel particles not necessarily constitute a percolating network.

In another embodiment, the electrode layer comprises doped ceria, and the electrode layers advantageously comprise an electrolyte material and a catalyst material. In this embodiment, it is not necessary for the electrode layers to comprise at least one metal. Due to the symmetrical structure and compression of the electrolyte layer and possibly the outer layer in case of a multilayer structure, improved mechanical stability of the cell can also be achieved.

The above described advantages of course also apply to the thin separation membrane of the present invention.

The invention claimed is:

1. A thin solid oxide cell, comprising at least a porous anode layer, an electrolyte layer and a porous cathode layer, wherein the anode layer and the cathode layer comprise an electrolyte material, at least one metal and a catalyst material, and wherein:

the overall thickness of the thin cell is about 100 μm or less;

the electrolyte material of the anode layer and the cathode layer is selected from the group consisting of doped ceria, gallates and proton conducting electrolytes;

the at least one metal is selected from the group consisting of a FeCrMx alloy, and a NiCrMx alloy, wherein Mx is selected from the group consisting of Ni, Ti, Ce, Mn, Mo, W, Co, La, Y, Zr, Al, and mixtures thereof;

the anode layer and the cathode layer are multilayer structures comprising at least two layers each, one of the layers in each of the anode and cathode layer being in direct contact with the electrolyte layer; and the at least two layers of the cathode and the anode have a different thermal expansion coefficient, wherein the respective layers directly in contact with the electrolyte layer have: i) an identical thermal expansion coefficient prior to impregnation which is larger than the thermal expansion coefficient of the electrolyte layer; and ii) a thermal expansion coefficient larger than the thermal expansion coefficient of the respective second layers of the electrodes.

2. The thin solid oxide cell of claim 1, wherein the electrolyte layer has a thickness of about 2 to about 20 μm.

3. The thin solid oxide cell of claim 1 or 2, wherein the cathode layer, the anode layer, or both, have a thickness of about 65 μm or less.

4. The thin solid oxide cell of claim 1, wherein the electrolyte layer is a multilayer structure comprising at least two layers.

* * * * *